(No Model.) 2 Sheets—Sheet 1.
J. D. MATTISON.
ROLLER BEARING.
No. 515,006. Patented Feb. 20, 1894.
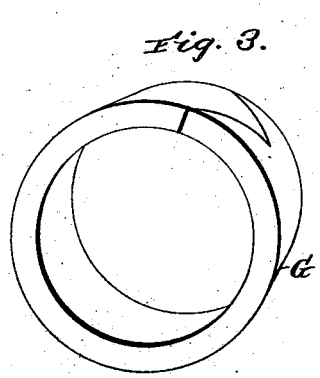
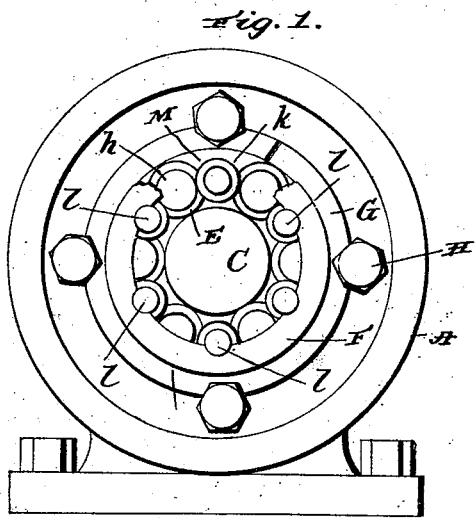
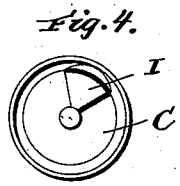
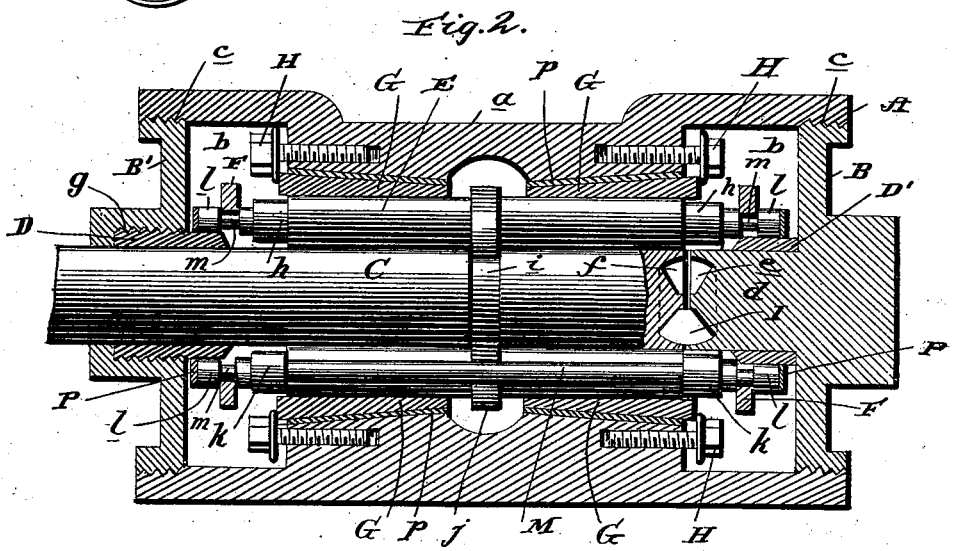
Witnesses:
Inventor
James D. Mattison
By James J. Sheehy
Attorney (No Model.) 2 Sheets—Sheet 2.

J. D. MATTISON.
ROLLER BEARING.

No. 515,006. Patented Feb. 20, 1894.

Witnesses:

Inventor
James D. Mattison
By James J. Sheehy
Attorney

UNITED STATES PATENT OFFICE.

JAMES D. MATTISON, OF SAGINAW, MICHIGAN.

ROLLER-BEARING.

SPECIFICATION forming part of Letters Patent No. 515,006, dated February 20, 1894.

Application filed December 30, 1891. Serial No. 416,610. (No model.)

*To all whom it may concern:*

Be it known that I, JAMES D. MATTISON, a citizen of the United States, residing at Saginaw, in the county of Saginaw and State of Michigan, have invented certain new and useful Improvements in Roller-Bearings; and I do declare the following to be a full, clear, and exact description of the invention, such as will enable others skilled in the art to which it appertains to make and use the same.

My invention has relation to improvements in anti friction journal bearings, and it has for its general object to provide a bearing of such a construction that all of the moving parts present to each other and to the parts they engage only rolling surfaces so as to prevent abrasive friction and consequent wear of the parts.

A further object of the invention is to provide a bearing embodying such a construction that frictional wear incidental to endwise or longitudinal movement of the shaft and bearing rollers, will be prevented.

Other objects and advantages will be fully understood from the following description and claims when taken in conjunction with the annexed drawings in which—

Figure 5:
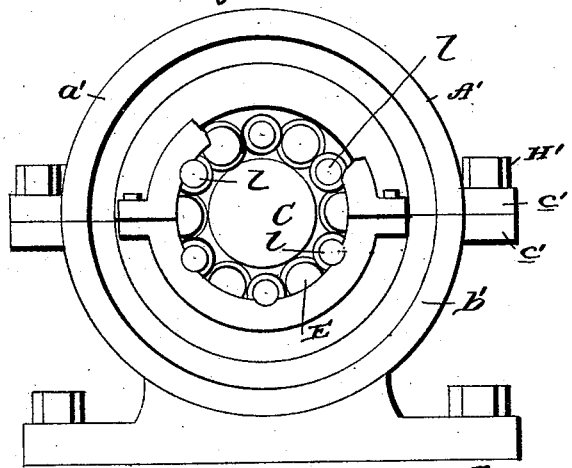
Figure 6:
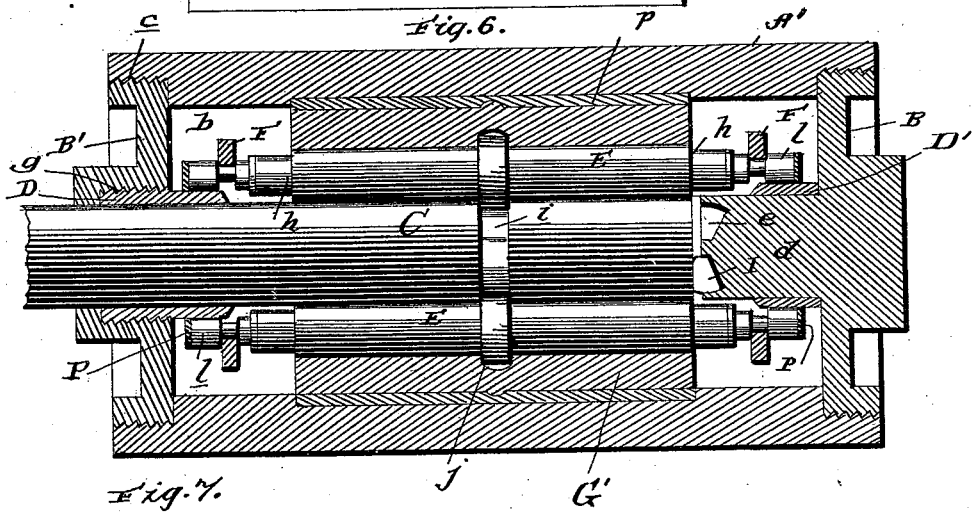
Figure 7:
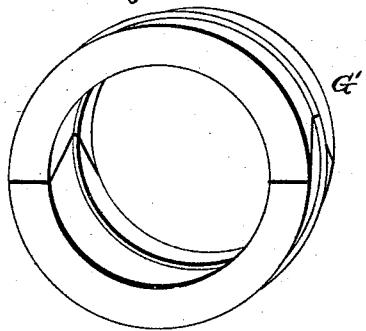
Figure 8:
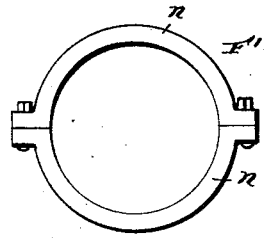

Figure 1, is an end elevation of my improved bearing with one of the heads of the boxing removed, and parts broken away to permit of a better illustration of the rollers. Fig. 2, is a longitudinal, diametrical section of the same. Fig. 3, is a perspective view of the lining removed. Fig. 4 is an elevation of the inner end of the shaft; the anti friction, cone shaped roller being illustrated in the groove thereof. Fig. 5, is a view similar to Fig. 1, illustrating a modified construction of bearing adapted to be more readily applied to a shaft. Fig. 6, is a longitudinal diametrical section of the same. Fig. 7, is a detail perspective view of the lining employed in the modified construction, and Fig. 8, is an elevation of the sectional ring employed in such construction for retaining the intermediate rollers.

Referring by letter to said drawings and more particularly to Figs. 1, to 4, thereof: A, indicates the boxing of my improved bearing, which is of a general cylindrical form, and comprises the body portion $a$, and the recessed ends $b$. These recessed ends $b$, of the boxing, as better illustrated in Fig. 2, of the drawings, are interiorly threaded as indicated by $c$, for the engagement of the threaded heads B, B', which serve to close the ends of the boxing as shown. This manner of connecting the heads B, B', to the boxing, is preferable, but I do not desire to be confined to the same, as the heads in practice may be connected in any approved manner.

The head B, of the boxing is provided with a central inwardly-directed branch or neck $d$, in the end of which is formed a circular groove $e$, which is preferably of an approximate cone shape in cross section and is designed to serve in conjunction with a similar groove $f$, formed in the end of the shaft C, to receive the approximately cone shaped roller I, through the medium of which frictional wear of the neck $d$, of the head B and the shaft is prevented.

The head B', of the boxing is provided with a central, interiorly threaded sleeve $g$, in which is arranged the exteriorly threaded sleeve or collar D, which is preferably formed from steel and extends inwardly from the said head B', and is designed to serve in conjunction with the steel sleeve or collar D', on the branch or neck $d$, of the head B, to form bearings for the ends of the intermediate friction rollers presently described. While the steel sleeve or collar on the branch or neck $d$, is desirable, I do not desire to be confined to the use of the same as it is obvious to those skilled in the art, that the branch or neck $d$, might be enlarged or shouldered to form a bearing for the intermediate rollers, and the steel sleeve or collar dispensed with. It is also obvious that the sleeve or collar D, might be connected to the head B', in any approved manner and I therefore do not desire to be confined to the manner set forth of connecting said sleeve.

E, indicates the shaft engaging or bearing rollers, which have their ends reduced in diameter as indicated by $h$, and are provided, preferably midway their length with collars $j$, designed and adapted to engage the annular groove $i$, in the shaft C, so as to prevent longitudinal play of the rollers in the box.

In some cases it is obvious that instead of grooving the shaft C, and providing the rollers E, with collars as just described, the said rollers might be provided with grooves and the shaft with a collar to accomplish the same purpose. Arranged between the rollers E, and designed to hold the same apart, are the intermediate friction rollers M. These rollers M, may be made short and arranged in two series; one at each end of the boxing, but I prefer in practice to make them of the proportional length illustrated, in which case but a single series is employed. When the rollers M, are made of the length illustrated they are necessarily small in diameter, and they are provided adjacent to their ends with diametrically enlarged portions $k$, designed to bear upon the reduced ends $h$, of the rollers E, as better illustrated in Fig. 1. The rollers M, have their end portions $l$, of a greater diameter than the portion between the collars $k$, and they are provided in said end portions with annular grooves $m$, for the engagement of the circular rings F, which serve to hold the intermediate rollers in engagement with the shaft engaging rollers and the bearing sleeves or collars D, D'.

It will be seen from the foregoing description that the rollers M, bear upon the sleeves or collars D, D', alone, and the rollers E, bear only upon the shaft, by reason of which sliding friction in any part of the bearing is prevented.

As better illustrated in Fig. 2, of the drawings, the inner surface of the body of the boxing A, decreases in diameter from its ends toward its middle to receive the linings G, which preferably have their outer surfaces beveled as shown. These linings G, may be split in any approved manner, but I prefer in practice to split them, as better illustrated in Fig. 3, of the drawings, so that they will contract or collapse under pressure; and the said linings are forced into their seats in any approved manner, and are held and adjusted when it is necessary take up wear, by the flanged screws H, which take into the body of the boxing, as shown.

In Figs. 5, to 8, of the drawings, I have illustrated a construction of bearing which is similar in general principle to that illustrated in Figs. 1, to 4, but is adapted to be more readily placed in position upon the end of a shaft extending close to a wall without taking the shaft down. In this modified construction I form the boxing A', in two sections $a'\ b'$, as illustrated, and provide each section with flanges $c'$, for the passage of the connecting bolts H', through the medium of which the single sectional lining G', is tightened or crowded upon the rollers E, when necessary.

F', indicates the modified construction of rings for holding the intermediate rollers M, in engagement with the rollers E, and the bearing sleeves or collars D', D. These rings F', comprise the two connected sections $n$, whereby it will be seen that they may be readily placed around a shaft at an intermediate point in the length thereof.

By reason of the boxing A', the lining G', and the rings F', being formed in sections as described, it will be perceived that the bearing may be readily placed in position upon a shaft without sliding it on the end thereof, which is an important desideratum.

In order to prevent noise while the shaft is in motion I design interposing a packing $p$, of some soft substance between the linings G, G', and the boxings A', A, and for the same purpose I design providing the ends of the intermediate rollers M, with washers or collars P, of friction fiber, or other suitable material, which washers or collars are large enough to firmly engage the sleeves or collars D, D', before the metal comes in contact therewith. The washers or collars P, above referred to, may be connected to the rollers M, in any approved manner, and as such connection forms no part of my invention, I have not deemed it necessary to illustrate the same.

From the foregoing description it will be seen that I have provided a roller bearing of a cheap and simple construction and one in which every movable part is protected against abrasive friction.

Although I have herein specifically described the construction and relative arrangement of the several elements of my improved bearing, I do not desire to be understood as confining myself to the same as it is obvious to those skilled in the art that various changes or modifications may be made as fairly fall within the scope of my invention.

Having described my invention, what I claim is—

1. In an anti-friction roller bearing, the combination of a boxing, the shaft engaging rollers, the comparatively small intermediate rollers adapted to engage the shaft engaging rollers and a collapsible lining interposed between the shaft engaging rollers and the boxing said lining being adapted to adjust the two series of rollers with respect to each other, substantially as specified.

2. In an anti-friction roller bearing, a shaft having a circumferential groove at an intermediate point in its length, and also having a circular groove $f$, in its end, in combination with a boxing, bearing rollers arranged within the boxing and having collars engaging the circumferential groove of the shaft, a head B arranged in one end of the boxing and having a circular groove $e$, corresponding to that of the shaft, a head B', arranged in the opposite end of the boxing, the intermediate rollers, the rings engaging said intermediate rollers, and an approximately cone shaped roller arranged in the contiguous grooves of the boxing head B and shaft, substantially as specified.

3. In an anti friction roller bearing, the combination with the boxing, the head B, arranged in one end of said boxing and having the branch $d$, the head B', arranged in the other end of the boxing and the bearing sleeve D, extending inwardly therefrom; of the shaft engaging or bearing rollers E, the intermediate rollers M, adapted to engage the rollers E, and the bearings at each end of the boxing and having the annular grooves adjacent to their ends, the rings adapted to engage the annular grooves of the rollers M, a lining surrounding the rollers E, a packing of soft substance interposed between the lining and the boxing, and washers of friction fiber, or the like, mounted upon the rollers M, and adapted to engage the bearings thereof, substantially as and for the purpose set forth.

4. In an anti-friction roller bearing, substantially as described, the combination with the boxing, the shaft engaging rollers E, the intermediate rollers M, having the enlarged portions adapted to engage the ends of the rollers E, and also having the annular grooves adjacent to their ends, and the rings adapted to engage the annular grooves of the rollers M; of the split and beveled linings interposed between the rollers E, and the boxing, and the flanged screws H, taking into the ends of the boxing and adapted to adjust and retain the linings, substantially as and for the purpose set forth.

5. In an anti-friction roller bearing, substantially as described, the combination with the boxing, the head B, having the inwardly directed central branch provided with a bearing sleeve and having a circular groove $e$, in its end the head B', and the bearing sleeve D, of the shaft C, having the circular groove $f$, in its end, the roller I, arranged in the grooves $e$, and $f$, of the head and the shaft, the shaft engaging or bearing rollers E, having the reduced ends $h$, the intermediate rollers M, adapted to engage the ends of the rollers E, and also having the annular grooves adjacent to their ends, the rings adapted to engage the annular grooves of the rollers M, the split and beveled housings interposed between the rollers E, and the boxing, and the flanged screws H, taking into the ends of the boxing and adapted to adjust and retain the housings, substantially as and for the purpose set forth.

6. In an anti friction roller bearing, the combination with the boxing, the shaft engaging rollers E, the intermediate rollers M, having the enlarged portions adapted to engage the ends of the rollers E, and also having the annular grooves adjacent to their ends, and the rings adapted to engage the annular grooves of the rollers M; of a collapsible lining interposed between the shaft engaging rollers E, and the boxing, and a suitable means for adjusting said lining, substantially as specified.

7. In an anti friction roller bearing, a shaft having a circular groove $f$, in its end, in combination with a boxing, bearing rollers arranged within the boxing and engaging the shaft, a head B, arranged in one end of the boxing and having a circular groove $e$, corresponding to that of the shaft, a head B', arranged in the opposite end of the boxing, the intermediate rollers, the rings engaging said intermediate rollers, and a cone shaped roller arranged in the contiguous grooves of the boxing head and shaft, substantially as specified.

8. In an anti friction roller bearing, the combination of a box, bearing rollers arranged within the box and engaging a shaft or journal, and intermediate rollers engaging the bearing rollers and tracks at the ends of the box for the intermediate rollers; the diameters of the bearing rollers and the intermediate rollers at their points of contact being the same, and the diameters of the intermediate rollers at the points where they bear upon the tracks, and the diameter of the said tracks being such that all parts in contact will operate without sliding friction, substantially as specified.

In testimony whereof I affix my signature in presence of two witnesses.

JAMES D. MATTISON.

Witnesses:
SETH T. GODDARD,
CHARLES S. WATSON.